United States Patent [19]
Heller et al.

[11] 3,851,474
[45] Dec. 3, 1974

[54] STEAM TURBINE POWER PLANT, MORE PARTICULARLY ATOMIC POWER STATION

[75] Inventors: László Heller; László Forgó; Árpád Bakay, all of Budapest, Hungary

[73] Assignee: TRANSELEKTRO Magyar Villamossagi Kulkereskedelmi Vallalat, Budapest, Hungary

[22] Filed: Oct. 27, 1972

[21] Appl. No.: 301,684

[30] Foreign Application Priority Data
Oct. 27, 1971 Hungary .................... EE 1966

[52] U.S. Cl. .................. 60/644, 60/655, 60/690
[51] Int. Cl. .................. F01k 17/06, F01k 23/02
[58] Field of Search ........... 60/38, 49, 95, 644, 655, 60/690

[56] References Cited
UNITED STATES PATENTS

| | | | |
|---|---|---|---|
| 3,043,763 | 7/1962 | Spillmann | 60/49 |
| 3,257,806 | 6/1966 | Stahl | 60/38 X |
| 3,266,246 | 8/1966 | Heller et al. | 60/38 |
| 3,660,980 | 5/1972 | Knirsch et al. | 60/95 R |
| 3,731,488 | 5/1973 | Sasakura et al. | 60/95 R |

Primary Examiner—Edgar W. Geoghegan
Assistant Examiner—Allen M. Ostrager
Attorney, Agent, or Firm—Blum, Moscovitz, Friedman & Kaplan

[57] ABSTRACT

The condensers of steam turbine power plants are operated with cooling water which is, in turn, recooled by wet or dry cooling towers. In case of wet cooling towers, the condensers are of the mixing condenser type. It means that the exhaust steam is condensed by directly contacting the cooling water.

Where the steam of such power plants is generated by atomic reactors such as boiling water reactors, the exhaust steam is radioactive and, therefore, must not directly contact the cooling water for reasons of ecology. The employment of surface condensers, on the other hand, in case of wet cooling towers is connected with a series of difficulties. In order to avoid this, it is suggested to employ a steam transformer upstream the low pressure stage of the steam turbine of the power plant. Then, the radioactive steam withdrawing from the high pressure stage of the turbine is condensed on the primary side of the steam transformer while the heat freed by such condensation will generate steam on the other side of the steam transformer from a condensate coming from a condenser. Thus, the secondary steam will not be contaminated by radioactive substances and, therefore, the steam of the low pressure stage of the steam turbine may already be condensed in a mixing condenser.

2 Claims, 1 Drawing Figure

PATENTED DEC 3 1974
3,851,474
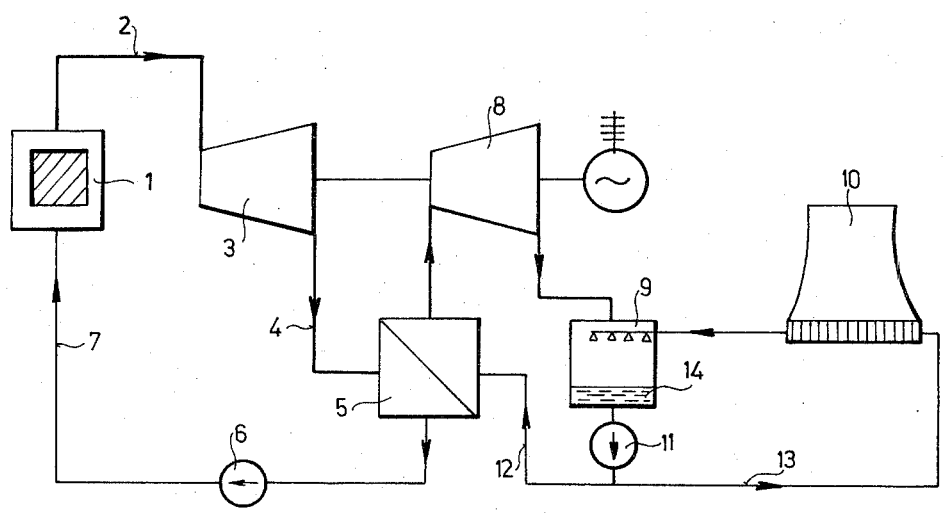

STEAM TURBINE POWER PLANT, MORE PARTICULARLY ATOMIC POWER STATION

This invention relates to steam turbine power plants and particularly to atomic power stations.

As is known, there are atomic power stations with which the steam turbine is traversed by radioactive steam as is the case e.g., with so-called boiling water reactors. Furthermore, it is known that big power stations require cooling by means of rivers and wet cooling towers or, recently, also by what is called indirect cooling by air (system Heller) by means of so-called dry cooling towers ("air condensation"). With the known air condensation systems of this type, the exhaust steam of the steam turbine flows into a mixing condenser where it becomes condensed by means of injected cooling water. The cooling water is of condensate quality. A suitable portion of the resulting mixture of cooling water and condensed steam flows as condensate into a wet cooling tower equipped with surface heat exchangers where the condensate will be recooled by means of ambient air. With employing such cooling in atomic power stations where radioactive steam is supplied into the turbine, radioactive steam might be admixed also to the cooling water. Thereby, the water circulating in the cooling tower might be rendered radioactive as well which is to be obviated for reasons of ecology.

In order to obviate such difficulty, it has been suggested to employ, in case of indirect cooling by means of air, a surface condenser rather than a mixing condenser, so that radioactive vapours may be separated from the cooling water. Such arrangement, however, is an emergency expedient only because both its realization as well as its control and operation are connected with difficulties. In addition, investment costs considerably increase and there is an inevitable temperature difference in the surface condenser whereby the overall efficiency of the power station decreases.

The main object of the present invention is to obviate the aforasaid difficulties and to provide a steam turbine power plant in which an indirect cooling by means of air may have a steam turbine operated by radioactive steam associated with it without additional or with so little increase of investment costs that their amount is much less than in cases where the steam circuit is separated from the cooling water circuit by means of surface condensers. The resultant loss in efficiency will be smaller than with power stations employing surface condensers.

The essence of the invention consists in that the radioactive steam is separated from the cooling water circuit by means of a suitable heat exchanger or steam transformer which is disposed upstream the low pressure stage of the steam turbine. The radioactive steam will be condensed on the primary side of the steam transformer coming from the high pressure stage of the steam turbine. On the other hand, the secondary side of the steam transformer will serve for producing steam the amount of which will correspond to the heat freed on the primary side of the steam transformer. Thus, no radioactive steam will expand in the low pressure stage of the steam turbine so that the cooling water recooled in an associated cooling tower may be permitted to contact the exhaust steam in a mixing condenser without being contaminated by radioactive substances.

As is known with boiling water reactors, the entire amount of steam is extracted between the high pressure stage and the low pressure stage of the steam turbine for the purpose of carrying out an indispensable drying and a reheating. With the power plant according to the invention, a drying of the steam may, due to the steam transformer, be dispensed with since the steam which would be too wet for further expansion is precipitated in primary side of the steam transformer while the steam generated on the secondary side thereof will practically be dry. In addition, reheating is necessarily reduced due to the temperature difference in the steam transformer. Thus, a steam dryer built together with a steam reheater as well, as the surface condenser have, in the power plant according to the invention, a steam transformer and a mixing condenser substituted therefor.

The invention is distinguished by a series of advantages. More particularly, investment costs are incomparably lower than with separating the radioactive steam circuit from the cooling water circuit by means of surface condensers. Viz., the surface of the steam transformer amounts to roughly the half of that of a corresponding surface condenser since the temperature difference may considerably be greater with a steam transformer than in case of surface condensers. Namely, with higher temperature levels, a certain heat drop will correspond to relatively greater temperature differences. At the same time, also the heat transfer coefficient is increased because the steam transformer has on both its sides phase changing media participating in the heat exchange. Moreover, the surface of the required reheaters is likewise roughly by the half smaller if the original expansion line in the turbine corresponds to the value which would be obtained in case of employing a surface condenser. Viz., in such cases a temperature difference to be employed in the steam transformer requires lesser superheating so that also the amount of heat to be supplied for reheating purposes decreases roughly to half of the otherwise required value. Furthermore, the decrease in the amount of heat required for reheating entails an increase of the thermal efficiency of the entire power station. The otherwise indispensable steam dryer may be dispensed with. Finally, the invention offers the advantage that the low pressure stage of the steam turbine will be relieved from corrosive vapours so that there is no necessity of employing expensive corrosion resistant work materials.

Further details of the present invention will be described by taking reference to the accompanying drawing the FIGURE of which shows the connection diagram of a steam turbine power plant according to the invention.

A steam generating means such as an atomic reactor 1, e.g. a boiling water reactor is connected through a steam conduit 2 with the high pressure stage 3 having an inlet and an outlet of a steam turbine. The high pressure stage 3 of the steam turbine is connected through a further steam conduit 4 with the primary side of a heat exchanger or steam transformer 5. The primary side of the steam transformer 5 is connected through a condensate conduit 7 comprising a circulation pump 6 to the atomic reactor 1.

The secondary side of the steam transformer 5 is connected with the low pressure stage 8 having an inlet and an outlet of the steam turbine the outlet of which opens into a mixing condenser 9. The water chamber 14 of the mixing condenser 9 is connected via its outlet through a delivery pump 11, on the one hand, with a condensate conduit 12 connected, in turn, with the secondary side of the steam transformer 5 and, on the other hand, through a condensate conduit 13 with the heat exchangers of a cooling tower 10. The heat exchangers of the cooling tower 10 are connected with a spray device in the mixing condenser 9.

In operation, the steam generated in the atomic reactor 1 flows through the steam conduit 2 into the high pressure stage 3 of the steam turbine 3, 8. The steam expanded in the high pressure stage 3 flows through the steam conduit 4 into the primary side of the steam transformer 5 where it becomes precipitated and wherefrom the precipitated steam, in the form of a condensate, flows through the circulation pump 6 and the condensate conduit 7 back into the atomic reactor 1.

The heat freed from the precipitating steam in the primary side of the steam transformer 5 evaporates a condensate on the secondary side of the steam transformer 5 which arrives through the condensate conduit 12. The generated steam flows into the low pressure stage 8 of the steam turbine 3, 8. The expanded steam withdraws from the low pressure stage 8 into the mixing condenser 9 where it is condensed by means of cooling water injected through the spray device referrred to above. The condensate is removed from the water chamber 14 of the mixing condenser 9 by means of the delivery pump 11. One portion of the condensate flows through the condensate conduit 12 back into the secondary side of the heat transformer 5, the amount of condensate corresponding to the amount of condensed steam. The other portion of the condensate the amount of which corresponds to the amount of cooling water is supplied by the delivery pump 11 through the conduit 13 back into the cooling tower 10 where it becomes recooled. The recooled cooling water is again supplied into the spray device of the mixing condenser 9.

It will be apparent that the steam turbine power plant according to the invention comprises a pair of circuits, viz., the radioactive steam circuit 1, 2, 3, 4, 5, 6, 7 and the non-radioactive cooling water circuit 9, 14, 11, 13, 10. As can be seen, the radioactive steam circuit 1, 2, 3, 4, 5, 6, 7 is separated from other portions of the plant and particularly from the low pressure steam circuit 8, 9, 11, 12 and, thereby, from the cooling water circuit 9, 11, 13, 10 in such a manner that no radioactive contamination can occur on the secondary side of the steam transformer 5.

What we claim is:

1. A steam turbine power plant, wherein water is converted to steam at high pressure by nuclear energy comprising steam-generating means for utilizing said nuclear energy for said conversion, a high-pressure stage turbine, the outlet of said steam generating means being connected to the inlet of said high pressure stage turbine, a steam transformer having a primary side and a secondary side, the inlet of said primary side being connected to the outlet of said high pressure stage turbine, first pump means connected for transferring condensate from said primary side to the inlet of said steam-generating means, a low-pressure stage turbine connected at its inlet to the outlet of said secondary side, a mixing condenser connected at an inlet to the outlet of said low-pressure stage turbine, a dry cooling tower connected to said mixing condenser for providing cooled water thereto, and second pump means connected to the outlet of said mixing condenser for recycling condensate from said mixing condenser to the inlet of the secondary side of said steam transformer and for recycling of warmed cooling water to said cooling tower, whereby the passing of radioactive water through said cooling tower may be avoided.

2. The steam turbine power plant as defined in claim 1 wherein said high and low pressure stage generators are mounted on the same shaft and radioactive steam traverses said high pressure stage generator.

* * * * *